US007563156B2

(12) United States Patent
Anderson

(10) Patent No.: US 7,563,156 B2
(45) Date of Patent: Jul. 21, 2009

(54) PLANETARY GRINDER

(75) Inventor: Martin L. Anderson, Maple Lake, MN (US)

(73) Assignee: National Carpet Equipment, Inc., Brooklyn Park, MN (US)

( * ) Notice: Subject to any disclaimer, the term of this patent is extended or adjusted under 35 U.S.C. 154(b) by 0 days.

(21) Appl. No.: 11/854,805

(22) Filed: Sep. 13, 2007

(65) Prior Publication Data

US 2009/0074511 A1    Mar. 19, 2009

(51) Int. Cl.
*B24B 23/00*    (2006.01)
(52) U.S. Cl. .................... 451/353; 451/357; 451/363
(58) Field of Classification Search .................. 451/340, 451/350, 353, 357, 363; 15/49.1; 475/150
See application file for complete search history.

(56) References Cited

U.S. PATENT DOCUMENTS

| 1,928,390 | A |   | 9/1933  | Myers |
|-----------|---|---|---------|-------|
| 3,169,262 | A |   | 2/1965  | Allen et al. |
| 4,719,659 | A | * | 1/1988  | Urakami ..................... 15/49.1 |
| 5,637,032 | A |   | 6/1997  | Thysell et al. |
| 6,238,277 | B1 | * | 5/2001  | Duncan et al. .............. 451/271 |
| 6,331,138 | B1 |   | 12/2001 | Witters et al. |
| 6,494,772 | B1 |   | 12/2002 | Barnes |
| 6,752,707 | B1 |   | 6/2004  | Palushi |
| 6,938,295 | B1 |   | 9/2005  | Lancaster |
| 7,033,258 | B2 |   | 4/2006  | Jordan |
| 7,140,957 | B2 |   | 11/2006 | Thysell et al. |
| 7,226,347 | B1 | * | 6/2007  | Padgett et al. ............... 451/353 |
| 7,326,106 | B1 | * | 2/2008  | Rogers et al. ............... 451/350 |
| 7,377,838 | B1 | * | 5/2008  | Van Vliet .................... 451/353 |
| 2003/0040265 | A1 | * | 2/2003 | Palushi ....................... 451/350 |
| 2004/0023608 | A1 | * | 2/2004 | Van Vliet et al. ............ 451/350 |
| 2006/0026781 | A1 | * | 2/2006 | Van Vliet .................... 15/49.1 |
| 2006/0172667 | A1 | * | 8/2006 | Jeansson ..................... 451/353 |
| 2007/0184762 | A1 | * | 8/2007 | Dummermuth-Furter ... 451/353 |

FOREIGN PATENT DOCUMENTS

EP          1 806 206 1       7/2007

* cited by examiner

*Primary Examiner*—Eileen P. Morgan
(74) *Attorney, Agent, or Firm*—Nikolai & Mersereau, P.A.; Thomas J. Nikolai

(57) ABSTRACT

A planetary grinding machine having a simple design with a minimal number of parts, which are all easily accessible for maintenance and repair is disclosed. The machine has a rotating planetary disk with rotating screeding disks attached. The planetary disk is driven by a shaft extending through a top housing cover plate, which supports a transmission driven by a motor. As the planetary disk rotates, a single belt engages a stationary gear on the cover plate and pulleys on screeding disk shafts to turn the screeding disks as the planetary disk is turned. The belts and pulleys for the drive mechanism are sandwiched between the planetary disk and the top cover to protect the mechanisms from dust and debris. The bearings are sealed to prevent dust and debris from entering and oil from escaping. The bearings, being on the inside of the planetary disk, keep oil from landing on the floor.

9 Claims, 4 Drawing Sheets

PLANETARY GRINDER

BACKGROUND OF THE INVENTION

1. Field of the Invention

This invention relates to a planetary grinder for abrading floor surfaces with a rotating circular planar surface tool and more particularly to the planetary drive mechanism of the planetary grinder.

2. Description of the Related Art

Presently available disk floor abrading machines have separate means for rotating the planet disk and the screeding disks mounted thereon which requires a complicated and difficult to maintain mechanism for providing power to the screeding disks and the planetary disk.

In some designs there are multiple gears or multiple belts needed to drive the planet disk and the screeding disks. Other designs have counter-rotating screeding disks which add complications to the design.

Some disk floor abrading machines expose their working mechanisms to dust, debris or abraded particles which reduce the life of the machine due to extra wear on the parts. Other machines have hard to reach parts for making adjustments or repairs.

It is desirable to have a simple to make, simple to maintain, low cost and reliable means to power the screeding disks and the planetary disk of a planetary grinder without exposing the working mechanism to dust, debris and other particles.

SUMMARY OF THE INVENTION

The planetary grinder has a top cover plate for supporting a motor and a transmission on its top surface, for easy access, for maintenance and repair and to keep the motor and transmission free from dust and debris resulting from the floor screeding process. The planetary grinder has a rotating planetary disk driven from the transmission's output shaft under the cover plate for supporting a plurality of rotating screeding disks. The driving mechanism for the screeding disks is sandwiched between the top cover plate and the planetary disk to protect the bearings and belts therebetween from dust and debris. The bearings for the transmission shaft and the screeding disks are sealed to further protect the parts from excess wear due to dust and debris. The top cover plate has a stationary gear attached for engaging a single toothed belt to drive the screeding disks. The belt engages the stationary gear such that, as the planetary disk rotates, the belt turns the pulleys on the screeding disk shafts to rotate the screeding disks at a speed in proportion to the rotation speed of the planetary disk. The screeding disks can be rotated in the opposite direction from the rotation of the planetary disk to counter the torque created thereby and make the planetary grinder easier to control by the user.

The planetary disk assembly is easy to remove from the transmission's output shaft to expose all the moving parts in the mechanism for cleaning, maintenance and repair or replacement of the parts. The design is simple to repair, having only one belt which drives all the screeding disks.

A plurality of adjustment pulleys are used adjacent the screeding disk pulleys to adjust the belt tension. Balancing blocks are used to balance the rotating planetary disk.

The wheels supporting the planetary grinder are set back from the planetary disk by arms which allow the planetary disk to be tilted perpendicular to the floor to expose the cutting tools and the screeding disks for ease of access during maintenance or repair.

OBJECTS OF THE INVENTION

It is an object of the invention to provide an easy to maintain and easy to repair planetary grinder.

It is an object of the invention to provide an external transmission on top of the housing.

It is an object of the invention to provide an external motor on top of the housing.

It is an object of the invention to provide sealed bearings on all the shafts to protect them from dust and debris.

It is an object of the invention to have the drive mechanism sandwiched between a top cover plate and the planetary disk to protect the drive mechanisms from dust and debris.

It is an object of the invention to have the top cover plate support a stationary gear constituting a main driving gear.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
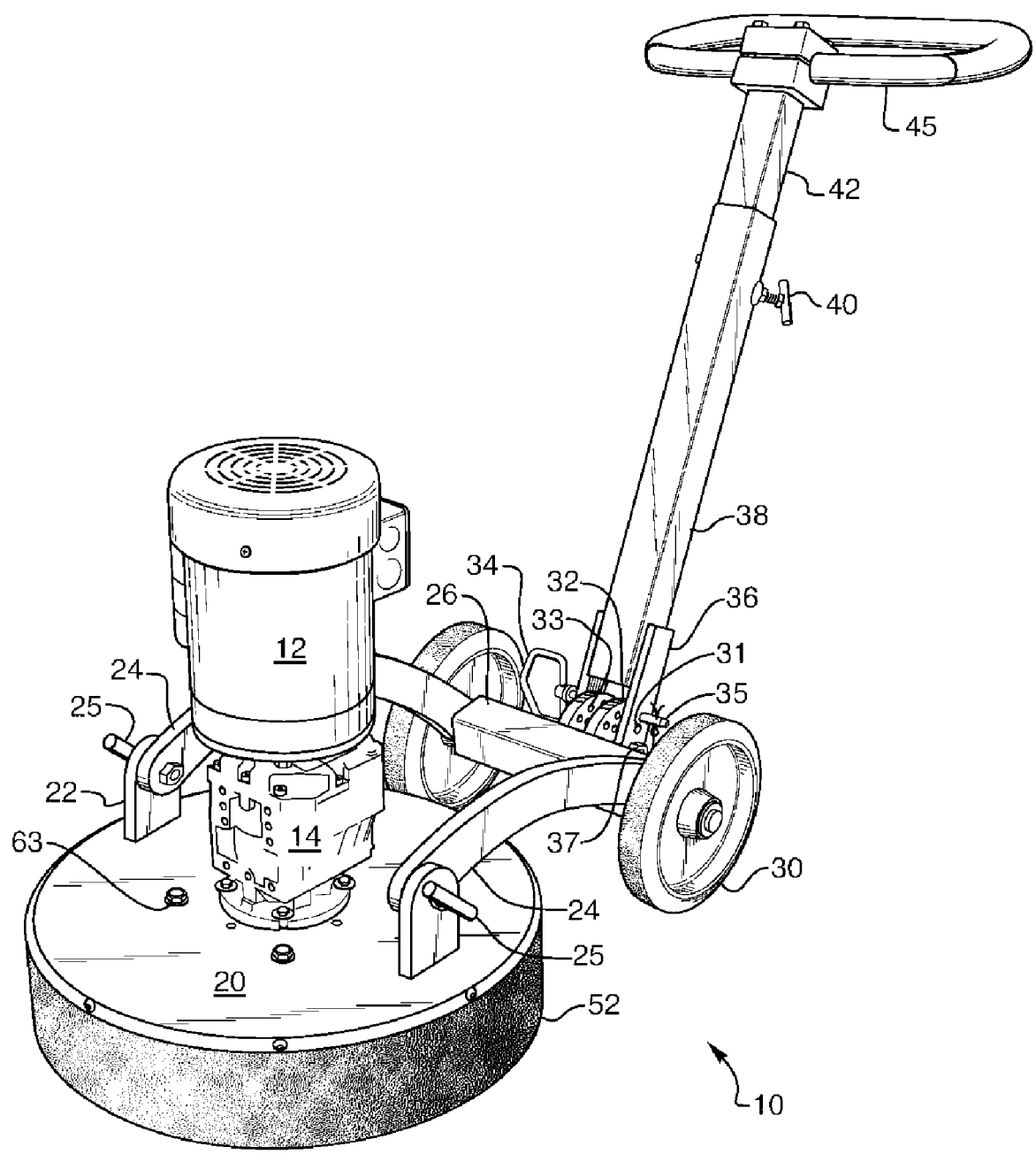
FIG. 1 is a perspective view of the planetary grinder.
Figure 2:
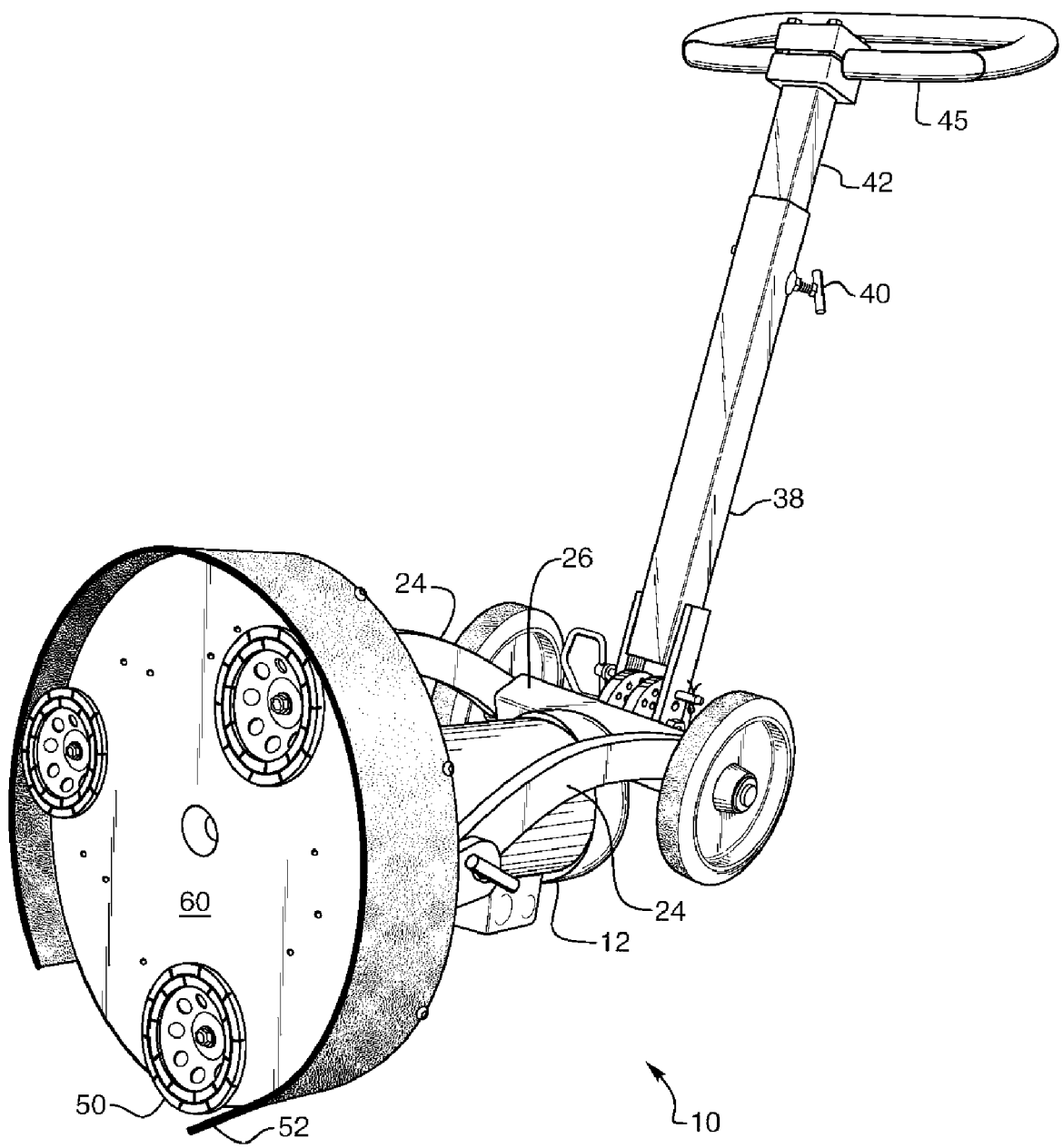
FIG. 2 is a perspective view of the planetary grinder with the drive disk tilted up.
Figure 3:
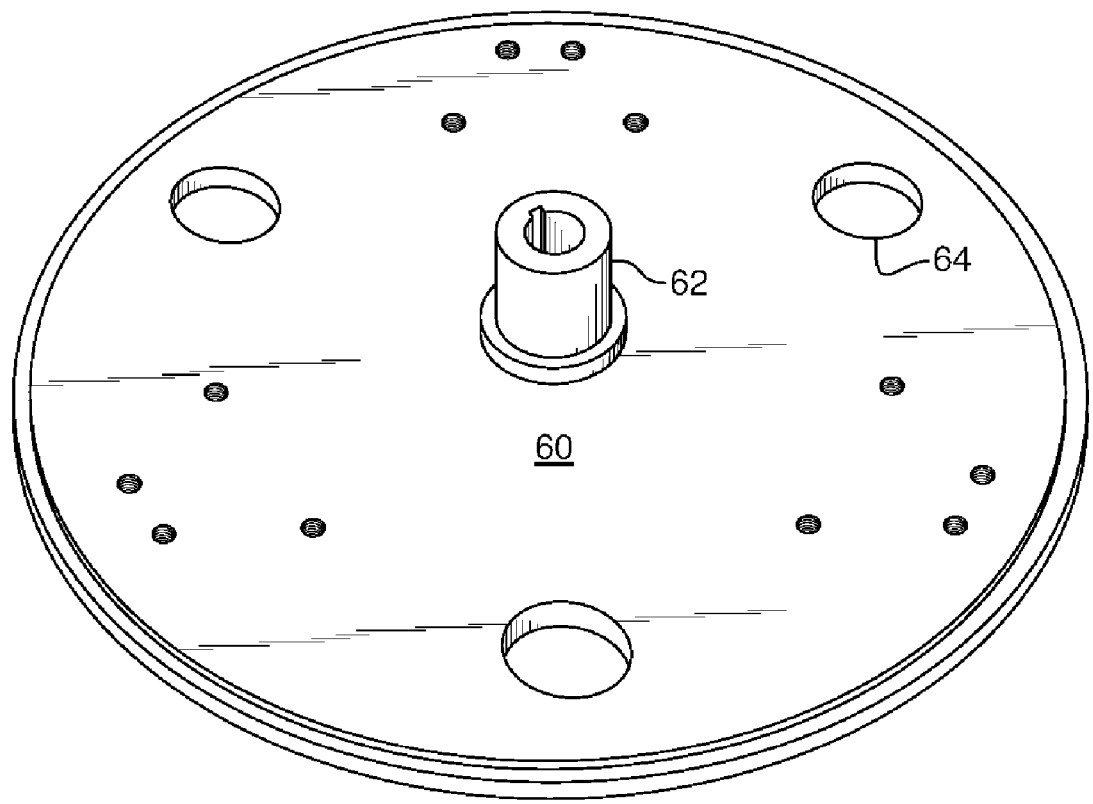
FIG. 3 is a perspective view of the planetary disk without any parts mounted thereon.

The planetary grinder 10 is shown generally in FIG. 1. It has a motor 12 which is preferably an electric motor and a transmission 14 attached to the motor 12. Although an electric motor is preferred, any kind of motor or engine for providing power can be used. The transmission 14 is attached to the top of a housing 20. Wheel mounts 22 are attached to the top of the housing 20 on each side of the transmission 14 and have arms 24 pivotally attached to the wheel mounts 22. T-bolts 25 are used to secure, either locked down or pivotally, the housing 20 in place relative to arms 24 to position the plane of the housing top 20 parallel to the floor to be worked on or perpendicular to the floor for maintenance of the screeding disks 50. The length of the arms 24 are preferably longer than the height of the motor 12 and the transmission 14 such that when the housing 20 is tilted perpendicular to the floor, the top of the motor 12 will clear the axle housing 26 at the end of the arms 24. Wheels 30 are attached to axles in the axle housing 26. The housing 20 sits close to the floor for a low profile of the planetary grinder 10, allowing the planetary grinder 10 to get under objects, such as shelving, while screeding the floor.

Handle mounts 32 are attached to the axle housing 26 for pivotally attaching a handle shaft 38 to the axle housing 26 by brackets 36 having adjustment apertures 31 and pin 35 for selecting an aperture in handle mount 32 to set the handle shaft 38 at the desired angle for operation of the planetary grinder 10. The handle shaft 38 pivots about bolt 37 through an aperture in brackets 36 and an aperture in handle mounts 32.

The length of the handle is adjustable as shaft 42 telescopes inside of handle shaft 38 and can be fixed at a desired length by T-bolt 40 engaging threads on handle shaft 38 and pressing against shaft 42.

A handle 45 on the top end of shaft 42 allows the user to push, pull or steer the planetary grinder 10.

The planetary disk 60 is driven by the output shaft of the transmission 14 and rotates while supporting screeding disks 50, which also rotate. The screeding disks 50 move in circles relative to the planetary disk 60 as the screeding disks 50 rotate on their axles. Hence, the floor experiences rotating screeding disks 50 engaging it while driven in a circular pattern by the planetary disk 60 while the planetary grinder 10 being pushed back and forth over the floor on wheels 30. The floor is therefore engaged by a plurality of screeding disks 50 having a cutting tool or abrading tool rotating to cover all portions of the floor as the planetary grinder 10 is maneuvered over the floor.

Sandwiched between the planetary disk 60 and the housing 20 is the drive mechanism which rotates the screeding disks 50. All of the moving parts for rotating the screeding disks 50 are mounted on the planetary disk 60 and are sandwiched between the planetary disk 60 and the housing 20, thus sealing all the bearings and the oils associated therewith above the planetary disk 60 so that the floor is protected from oil, grease and dirt emanating from the drive mechanism. The working mechanism is all contained between the planetary disk 60 and the housing 20 within a small height, making for a low profile planetary grinder.

The hub 62 on planetary disk 60 rotatingly engages stationary gear 65 by use of a bearing 68. A snap ring 67 is used to quickly and easily detach the hub 62 and thus the planetary disk 60 from the stationary gear 65. A gear mounting plate 69 attaches to drive gear 65 by bolts in apertures 61. Drive gear 65 is attached to the undersurface of the housing 20 by bolts 63 through housing 20 inserted into threaded apertures 61 in the gear mounting plate 69 attached to stationary gear 65, thus keeping the stationary gear 65 fixed in place while the planetary disk 60 rotates. When bolts 63 are removed housing 20 and gear mounting plate 69 are quickly easily detached and the working mechanism is exposed for ease of repair and maintenance. The ease of maintenance and repair reduces downtime making the planetary grinder 10 more efficient.

Hub 62 is attached to the output of shaft of transmission 14 such that planetary disk 60 rotates when the motor 12 is on and the transmission 14 is engaged. With planetary disk 60 rotating and stationary gear 65 fixed, belt 70 transmits power to the screeding disk pulleys 74 which connect to the screeding disks 50 by an axle passing through screeding disk apertures 64 in the planetary disk 60. In this manner the motor 12 rotates both the planetary disk 60 and the screeding disks 50 with a simple, easy to adjust, easy to maintain mechanism. As shown, a single endless belt 70 has teeth that engage the stationary gear 65 and the screeding disk pulleys 74. Although a toothed belt 70 is shown, a chain drive, a v-belt or other means for transmitting power maybe used to connect the stationary gear 65 to the screeding disks 50 by way of screeding disk pulleys 74.

Alternatively, a belt 70 with teeth on both sides may be used such that the idler pulleys 72 have the benefit of a geared pulley and the teeth of the belt 70 engaging. Also with a double-sided toothed belt, the belt can be moved from one side of the screeding disk pulley 74 to the opposite side causing the screeding disk 50 to spin the opposite direction. Using this method for selecting the spin direction of the screeding disks 50, planetary grinders having four screeding disks can have two screeding disks spinning in one direction and two screeding disks spinning in the opposite direction.

As shown, when planetary disk 60 rotates in direction of arrow 80, the screeding disk 50 will rotate in the opposite direction of arrow 82, thus providing stability of the planetary grinder 10 by having planetary disk 60 counter-rotating to the direction of rotation of the screeding disks 50 which engage the floor with an abrading tool.

It is preferable to use sealed bearings on the idler pulleys 72 and the screeding disk pulleys 74 to keep oils from landing on the floor and to protect the bearings from dust and other particles. Sandwiching the idler pulleys 72 and the screeding disk pulleys 74 and the driving mechanism between the planetary disk 60 and the housing 20 helps to keep the abraded flooring material, dust, dirt and other particles from interfering with the drive mechanism and getting into the bearings, on the belts, and on the moving parts, which will cause wear on the parts.

Figure 4:
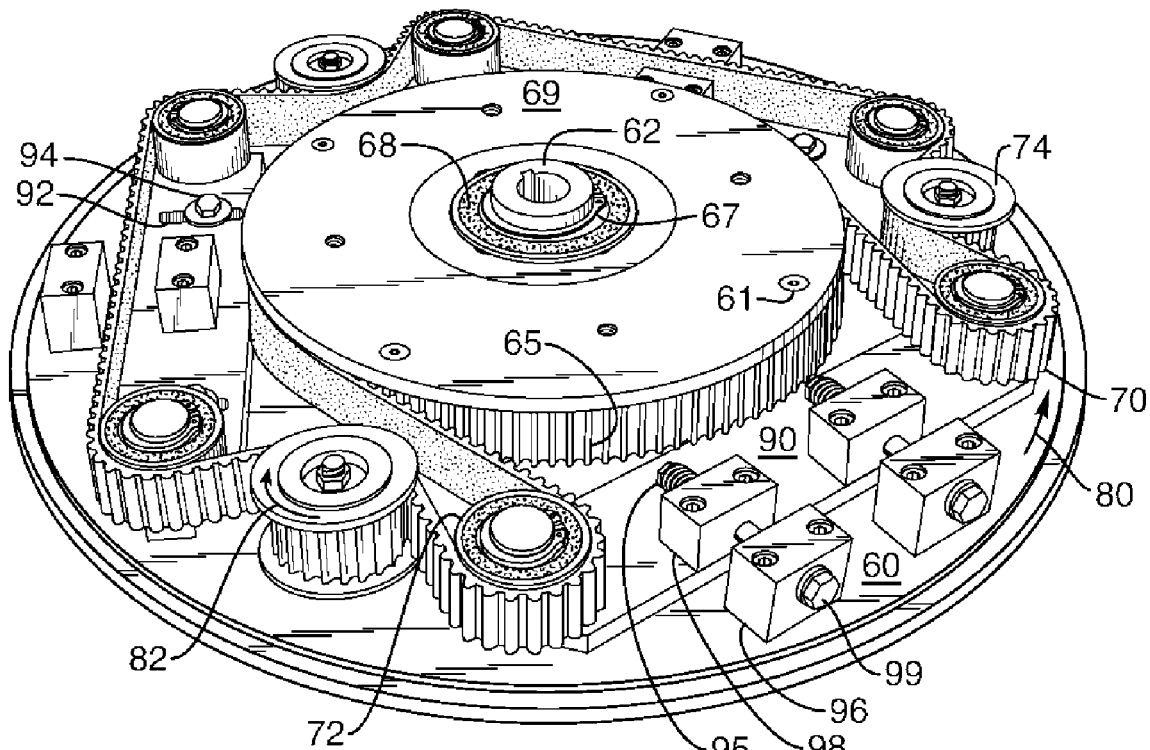
FIG. 4 is a perspective view of the planetary disk with the drive mechanism installed thereon.

As shown in FIG. 4, idler pulleys 72 are on adjustment bars 90 having adjustment slots 92 and adjustment bolts 94 for locking the adjustment bars 90 in place. In this manner belt 70 can be easily installed and the tension thereon adjusted, making it easy to change belts if needed. Adjustment blocks 96 and 98 can be used in conjunction with adjustment bolt 99 and tension springs 95 to move the adjustment bars 90 for balancing the planetary disk 60 as it spins. The tension springs 95 help keep a desired tension on belt 70. Adjustment blocks 96, 98 maybe of different weights to help balance planetary disk 60.

Figure 6:
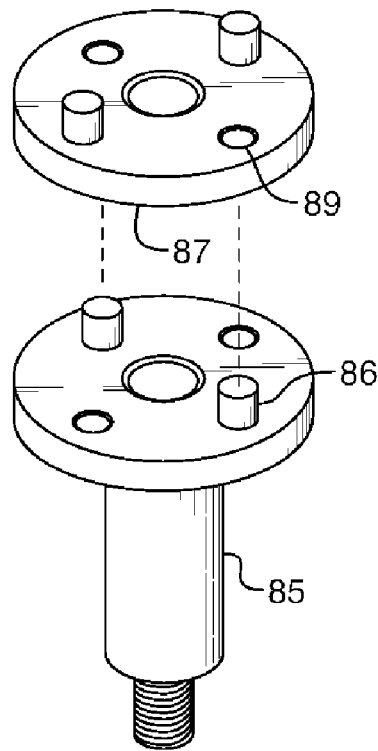
FIG. 6 is a perspective view of the planetary scrubber shaft with break way pins unassembled.
Figure 7:
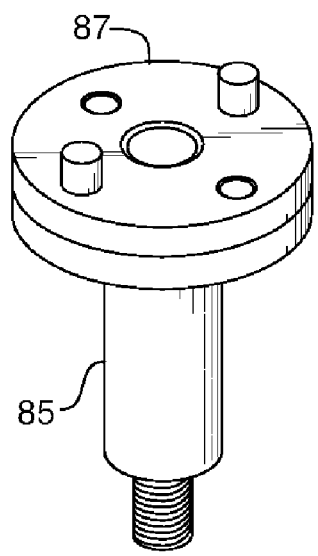
FIG. 7 is a perspective view of the planetary scrubber shaft with break way pins assembled.

It is preferred to have a break-a-way safety clutch plate 85 with a pin 86 made of plastic or metal, such that if a nail or other object is struck by a screeding disk 50 or an abrading tool attached thereto, the pin 86 will shear, so damage to the planetary grinder 10 will be prevented and the safety of the operator will be enhanced. FIG. 6 and show the break-a-way safety clutch plate 85 with break-a-way pin 86 for insertion into apertures 89 on screeding disk connectors 87.

A shroud 52 is provided on housing 20 to block debris, dust and abraded material from leaving the area under the drive disk and to aid in vacuuming when a vacuum is attached. There can be one or more ports in the shroud 52 for connection to a vacuum system attached to the planetary grinder 10. The ports may be in various locations around the shroud 52. A vacuum dust collection bag may be attached to the handle shaft 38. The shroud 52 can be attached with a hook and loop fastener such as VELCRO® for ease of height adjustment and can be long enough to engage the floor for vacuum efficiency and confining debris and dust. In addition to the vacuum, a water dispenser can be added to inject water under the shroud 52 to help keep the dust down.

The motor 12 and transmission 14 being on top of the housing 20 make it easy to repair, replace or maintain the motor 12 and transmission 14. Similarly, the belt 70, pulleys 72, 74 and the stationary gear 65 are easily accessible and adjustable for ease of maintenance and repair. The hub 62 can be easily removed from the stationary gear 65 with the use of a gear puller.

Planetary disk 60 can be balanced with all parts installed thereon by use of a bubble balance and balance weights such as used on car wheels.

Figure 5:
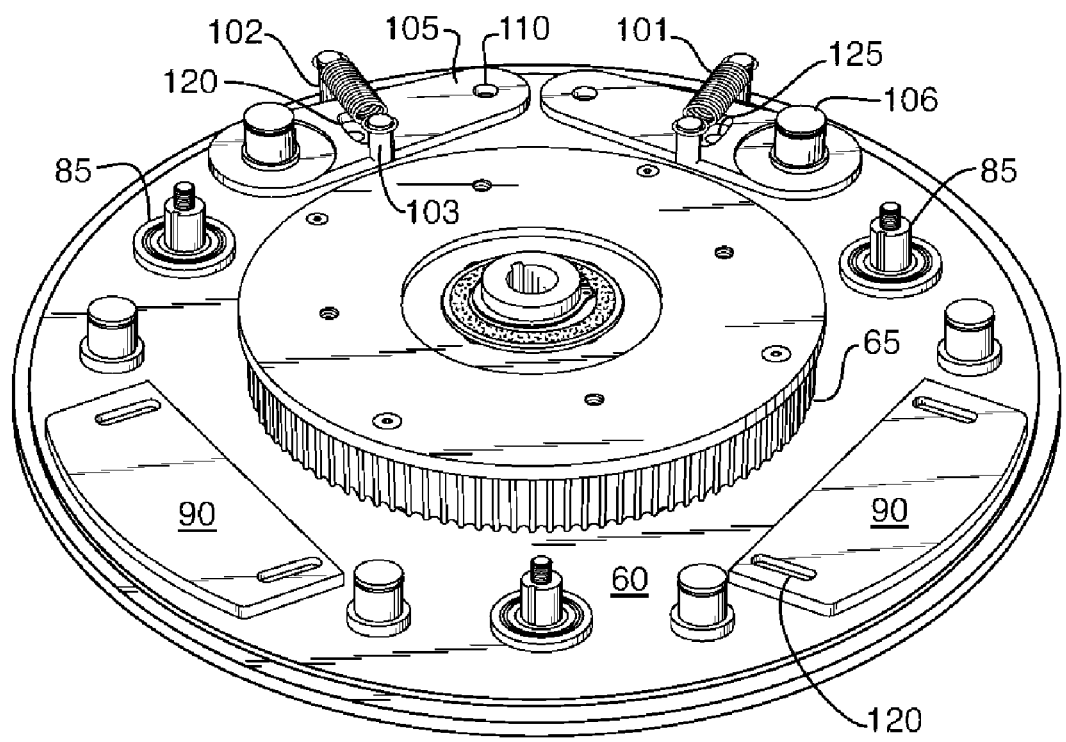
FIG. 5 is a perspective view of an alternative drive mechanism with a different belt tightening method.

In an alternative embodiment shown in FIG. 5 the tension belt 70 can be regulated by springs 101 which connect pin 102 attached to planetary disk 60 to pin 103 on pivotable idler bracket 105 having idler wheel 106 which pivots about aperture 110 which has a fastener connecting it to planetary disk 60. A guide slot 120 in pivotable idler bracket 105 may be used to help align the pivotable idler bracket 105 when a pin is used in aperture 125 on planetary disk 60.

Different sized planetary disks 60 can be used with different sized motors and different transmissions. Similarly different pulley wheel sizes and belts may be used to control the speeds of the screeding disks 50. The screeding disks 50 may have different cutting or abrading tools attached depending on the cutting, polishing, sanding or other operations to be performed.

One advantage of using a belt drive with screeding pulleys 74 and idler pulleys 72 is that the size of the pulley wheels can be easily changed thus changing the ratios of the stationary gear 65 to the gear on the screeding disk pulley 74 and thus the rational speed of the screeding disks 50 on the floor. The higher the ratio of the screeding disk gear to the drive stationary gear 65, the smoother the operation of the grinder. The ratios can be on the order of 4.3 to 1 and 7 to 1. Thus a quick and easy change of pulleys can change the performance of the grinder 10 depending on floor materials, and cutting tools used giving the belted grinder greater versatility over gear-to-gear grinders.

Another advantage of the belt drive planetary grinder is the ability to change from a screeding disk 50 with the axle centered in the disk to an off-center stationary gear 65 for eccentric screeder disks 50, which may be preferred for wood floors. The screeder disks 50 can be quickly and easily changed by removing the belt 70 from the screeder disk pulley 74 and inserting an eccentric screeder disk 50 and its associated pulley and the replacing the belt. Similarly, satellite disks may be used on a screeder disk and the disks easily changed.

Wheels 30 are preferably placed close enough together so that they are within the diameter of the housing 20. The planetary grinder 10 can then be used along walls without the wheels 30 interfering when the housing 20 is adjacent to the building's wall. The screeding disks 50 come close to the edge of the planetary disk 60 to screed the floor as close to a wall as possible. The wheels 30 being close together allows the planetary grinder 10 to walk straight down a wall and have greater pivot maneuverability.

Shaft 42 or handle 45 can have the planetary grinder controls, such as the motor on/off switch, mounted thereon.

Obviously, many modifications and variations of the present invention are possible in light of the above teachings. It is therefore to be understood that, within the scope of the appended claims, the invention may be practiced otherwise than as specifically described.

What is claimed is:

1. A planetary screeding machine comprising:
a housing having a top plate,
a transmission attached to the top of the top plate, the transmission having a shaft passing though an aperture in the top plate,
a motor attached to the transmission, the motor disposed above the top plate,
a stationary gear attached to the bottom of the top plate and fixed in position relative thereto,
a planetary disk attached to the transmission shaft, and positioned below the top plate and the stationary gear,
at least one screeding disk rotatingly attached to the planetary disk, the screeding disk located below the planetary disk and having a shaft extending through the planetary disk with a pulley on the end of the shaft on top of the planetary disk, and a tool on the screeding disk for engaging a floor under the planetary disk,
a belt deployed about the stationary gear and the pulley on the screeding disk shaft, such that as the planetary disk is driven by the transmission shaft, the belt rotates the screeding disk.

2. A planetary screeding machine as in claim 1 having,
a pulley adjustably attached to the planetary disk for engaging the belt and adjusting the tension on the belt.

3. A planetary screeding machine as in claim 1 having,
balance blocks attached to the planetary disk to balance the planetary disk.

4. A planetary screeding machine as in claim 1 having,
a pair of wheels attached to the housing for moving the housing on a floor, and
a handle attached to the housing.

5. A planetary screeding machine as in claim 1 having,
a pair of arms pivotally extending to the housing, the arms length extending further than the distance from the top of the top plate to the top of the motor,
an axle housing attached between the arms,
a handle shaft attached to the axle housing,
a pair of wheels attached to the axle housing.

6. A planetary screeding machine as in claim 2 having,
a pair of arms pivotally extending to the housing, the arms length extending further than the distance from the top of the cover plate to the top of the motor,
axle housing attached between the arms,
a handle shaft attached to the axle housing,
a pair of wheels attached to the axle housing.

7. A planetary screeding machine as in claim 1 having,
a safety clutch plate on the screeding disk shaft connected to the screeding disk for a break a way connection to the screeding disk.

8. A planetary screeding machine as in claim 7 wherein,
the safety clutch plate has sacrificial pins in a first disk, the pins inserted in a second disk connected to the screeding disk such that if the screeding disk strikes an object the pins will break, allowing the screeding disk to disconnect from the screeding disk shaft.

9. A planetary screeding machine as in claim 2 having,
a spring connected from the planetary disk to a pivotable bracket on the planetary disk which holds the pulley for adjusting the tension of the belt on the pulley.

* * * * *